Aug. 9, 1966     L. F. SKUBIC     3,265,224
STACK STABILIZER FOR TIRES
Filed April 20, 1964
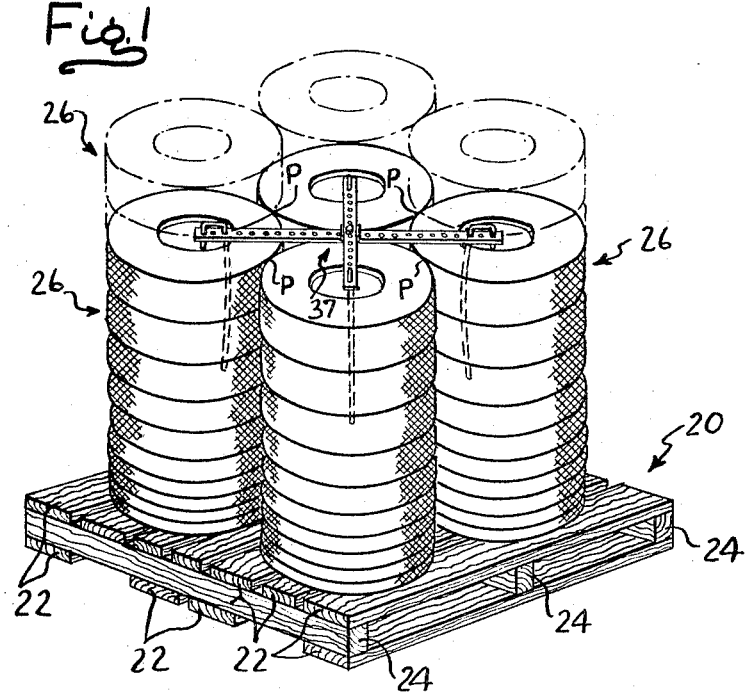
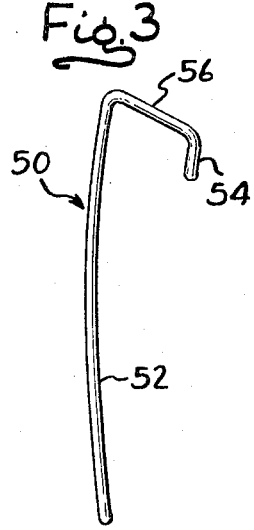
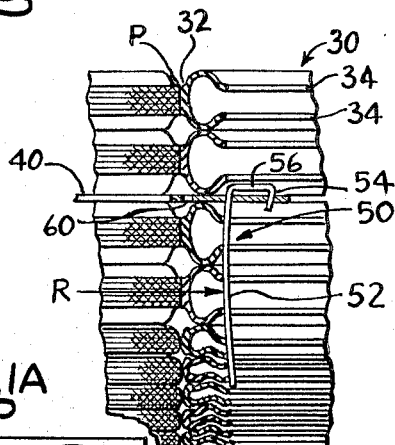
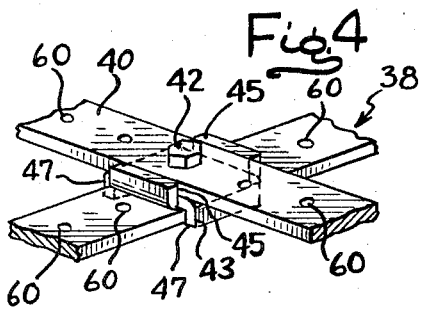
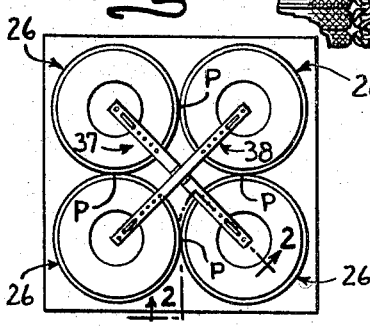
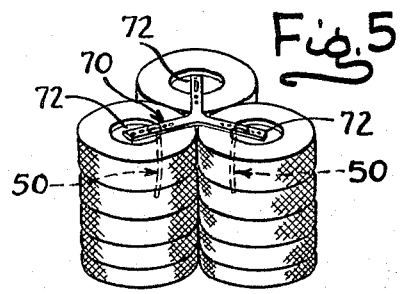
INVENTOR.
LEROY F. SKUBIC
BY
by: Wolfe, Hubbard, Voit & Osann
ATTYS.

United States Patent Office 3,265,224
Patented August 9, 1966

3,265,224
STACK STABILIZER FOR TIRES
Leroy F. Skubic, Long Beach, Ind., assignor to The Paltier Corporation, Michigan City, Ind., a corporation of Illinois
Filed Apr. 20, 1964, Ser. No. 360,827
9 Claims. (Cl. 214—10.5)

The present invention relates to apparatus for stabilizing vertical stacks of tires on a pallet or other supporting surface, and particularly to such apparatus for stabilizing stacks of so-called thin walled tires.

Pallets have long been employed in the transportation, storage and handling of tires in quantity. It has been found that by stacking tires on pallets, they may be easily and efficiently handled with fork lift trucks and comparable pallet handling equipment. Conventional 4 and 6-ply automobile tires are often handled in this fashion. In view of a marked increase in the manufacture of 2-ply tires for cars, however, particularly in the original equipment field (hereinafter referred to generally as "thin walled" tires), available tire handling equipment has not proven satisfactory.

The problem is one of maintaining the stability of the stacks of 2-ply or thin walled tires. It is caused by the apparent inability of the thin walled tires in the lower part of a stack to satisfactorily support the weight of the tires superimposed on them so as to permit quantity handling in the conventional manner. When such tires are placed one atop the other in vertical stacks, the lowermost one or two tires are almost completely flattened by the load of the tires above. Other tires in the lower part of the stack, while not completely flattened, are deformed to an extent that the tires resting on them tend to slide or move laterally on the weak side walls thereof, making the entire stack wobbly and unstable. Thus, where thin walled tires are being handled, prior known methods of stack stabilization, as for example, lashing the stacks of tires to a pallet and to each other are not particularly effective.

It is an objective, therefore, of the invention to provide an improved stack stabilizing fixture, particularly well suited for permitting efficient stacking of thin walled tires into stable stacks so as to permit their handling by conventional equipment.

A further object of the invention is to provide a thin walled tire stack stabilizing fixture adapted to ecomomically and efficiently stabilize stacks of such tires situated on a conventional pallet for handling thereon, the fixture being quick and easy to apply and remove as an incident to stacking and unstacking of the individual tires.

It is a more specific object to provide a stacking fixture for thin walled tires which lends lateral support to the stack where it is most needed, and in such a manner as to distribute symmetrically the vertical thrust loading on the lower tires in each stack whereby lateral sliding is eliminated.

These and other objects and advantages will become apparent from a reading of the following detailed description, taken in conjunction with the appended drawings, wherein:

FIGURE 1 is a perspective view of a conventional pallet having stacks of thin walled tires thereon together with an illustrative fixture, constructed in accordance with the invention, for stabilizing the same;

FIG. 1A is a plan view of the stacking fixture installed as shown in FIG. 1, but on a reduced scale;

FIG. 2 is an enlarged fragmentary vertical sectional view through two adjacent tire stacks on the pallet of FIGS. 1 and 1A with the stabilizing fixture installed, such view being taken in the plane of the line 2—2 in FIG. 1A;

FIG. 3 is an enlarged perspective view of one of the stabilizing rods of the illustrative fixture shown in FIGS. 1 and 2; and FIG. 4 is an enlarged fragmentary perspective view of the retainer rod supporting assembly of the apparatus of FIGS. 1 and 2; and FIG. 5 is a perspective view of an alternative fixture constructed in accordance with the invention.

While the invention is susceptible of various modifications and alternative constructions, a particular illustrative embodiment has been shown in the drawings and will be described below in considerable detail. It should be understood, however, that there is no intention to limit the invention to the specific form disclosed, but on the contrary, the intention is to cover all modifications, alternative constructions and equivalents falling within the spirit and scope of the invention as expressed in the appended claims.

Referring more particularly to FIGURE 1, the invention is there exemplified with respect to its use in stabilizing stacks of thin walled tires on a conventional pallet 20. The latter happens to be constructed with spaced deck boards 22 transversely disposed on either side of parallel stringers 24. In this instance, the tires are arranged in four uniform vertical stacks 26, resting upon the deck boards 22 of the pallet. The stacks are so disposed that their centers form an approximate square, with the tires of each stack abutting the tires of each adjacent stack approximately in planes cutting diametrically through the centers of adjacent stacks. FIG. 2 is illustrative of the manner in which adjacent stacks of tires abut.

The present invention is particularly, although not exclusively, concerned with thin walled tires such as 2-ply tires. It has been found that thin walled tires, in the uninflated state, are relatively unstable when stacked vertically in the manner illustrated in FIGS. 1 and 2 but without any stabilizing means. Referring to exemplary tire 30, for example, the tire carcass comprises generally a tread portion 32 and relatively thinner side walls 34. While modern tire technology has permitted the successful use of thin walled tires for automotive uses, the uninflated stiffness of such tires is substantially less than that presented by the heavier carcasses, such as the well-known 6-ply tire. Accordingly, when a number of tires 30 are stacked vertically for storage or transport on a pallet 20, the lowest tire, in this case 30a, is completely flattened, and adjacent tires 30b and 30c are almost flat. Thus, the stacks tend to be unstable, both in formation, when one is trying to build the stack, and during handling the transportation. This has been found to be true even though they are stacked in abutting relationship with adjacent stacks.

In keeping with the present invention, a novel fixture 37 is provided which stabilizes vertical stacks of thin walled tires on a pallet in a manner which makes optimum use of the relative positions of the respective stacks on the pallet. This is accomplished by the firm application of a squeeze pressure between respective tire stacks in a manner which produces increased lateral support and symmetrical distribution of vertical thrust load in each stack. At the same time, undue binding pressures which would cause undesirable deflection of the tire side wall, increasing the difficulty in stacking the thin walled tires, are avoided.

Upon more specific reference to FIGS. 1, 1A, and 4, it will be noted that the stabilizing fixture 37, in this instance, comprises a frame 38 in the form of a pair of apertured, elongated flat metal bars 40 tied together by a bolt 42, preferably at the center of each so that the portions extending outwardly are approximately equal in length. While the length of the bars 40 is not particularly critical, it has been found convenient to make the length of each bar approximately equal to the center-to-center distance between diagonally opposed stacks. Where desired, a positioning washer 43 may be provided at the juncture point between the bars 40. In the example shown, the washer 43 is formed with upturned flanges 45 defining one channel, and downwardly turned flanges 47 defining a second channel running transversely to the first channel. The channels are of sufficient width to receive the bars 40, and when the bars and washers are mounted, as illustrated in FIG. 4, the bars are disposed in an "X" with their legs mutually perpendicular. It will be appreciated that this particular disposition of the bars is in keeping with the relative position of the tire stacks on the pallet. It will also be appreciated that other suitable methods of joining the bars, including welding, will be satisfactory.

As previously noted, the tire stacks are arranged on the pallet 20 in a generally symmetrical fashion, forming an approximate square. The retainer bars 40 are disposed, as illustrated in FIGS. 1 and 1A, such that each bar lies on a line passing through the center of a pair of diagonally opposed stacks. The bars 40 are mechanically connected to the tire stacks by means of retainer members, here illustrated in the form of rods 50, shown best in FIG. 3.

Each retainer rod 50 comprises a vertical stabilizing portion 52, which extends downwardly (FIG. 2) and against the rim engaging peripheral portions of the tire side walls 34, and a hooked mounting end having an inturned portion 54 joined to the main stabilizer portion by means of a lateral intermediate portion 56. The inturned portion may be approximately parallel to the stabilizer portion, but for ease in securing the rod to the bar a slight angle may be imparted thereto.

In order that the stabilizer fixture may be assembled and dismantled quickly and with ease, the cross bars 40 are each provided with a plurality of longitudinally spaced holes 60. The distance between adjacent holes is approximately equal to the increments between a variety of common diameters. As will be seen, a number of holes are provided so as to make the fixture usable for tires of different known diameters, such as 13 through 16 inch diameter tires.

As shown more particularly in FIGS. 1 and 2, the vertical stabilizer portion 52 of each rod 50 is inserted through a hole 60 which is approximately in line with the inner edge of the side wall 34 of the tires. The inturned end portion 54 of the rod is inserted in another hole spaced from that of the rod portion 52. Reaction pressure of the tires on the retainer rod portion 52 (see arrow R, FIG. 2) is outwardly and tends to cause a binding action between the retainer rod portion 52 and the hole 60 in which it is inserted. This tends to lock the rod 50 on the bar 40 and against the inner edges of the tire side walls 34.

When, as seen in FIG. 1, four such rods are used with one extending into each stack of tires, the assembled fixture has a stabilizing effect comparable to four fingers of a large hand inserted in the center of each stack of tires, squeezing all of them toward the center of the stacks, to maintain the stacks stable and erect.

More specifically, considering the action of a single bar 40 having two rods 50 mounted in the holes 60, as previously described, and bearing against the inner edges of the side walls 34 of the tires 30, in abutting stacks, a squeezing effect is produced. With the tires stacked as shown in FIGS. 1 and 1A, i.e., the stacks of tires engaged by a particular bar are not themselves abutting, but abutting other stacks of tires, a component of this squeeze force is applied against such adjacent tire portions, likewise having a stabilizing effect. Accordingly, crossed stabilizer bars 40 are employed to apply squeeze pressures to diagonally opposed stacks of tires and the components of these forces are applied at the line of contact between abutting treads indicated at P (FIGS. 1, 1A and 2). This is even more evident in the lower tires which are bowed by the weight of the tires they support. In this manner, all four stacks of tires are squeezed together, providing a stabilized load for the pallet.

It is a further attribute of the present invention that by use of the stabilizing fixture herein described, it is not necessary for each tire of a stack to be engaged by the stabilizing rod 50. As will be seen in FIG. 2, the rod 50 extends downwardly against three or four tires in a stack which may contain many more tires, both below and above the rod extremities. By applying the stabilizer fixture at some intermediate point in the stack, usually in the area just above the completely flattened tires, sufficient lateral squeeze pressures are applied to the tire stacks to maintain all the tires in a stable condition, though more tires may be added to the stack above the fixture. This is so because the lower portions of the stacks are now stabilized by the finger-like squeezing action of the stabilizer bars and rods. The upper tires are under less vertical loading and, therefore, suffer less sidewall deformation. Accordingly, the stability of the upper portions of the stack is sufficient to permit handling and storage above the fixture without additional supporting structure. Thus, the squeezing action of the rods tends to adjust the application of the vertical forces to a place on the supporting tires which is best able to withstand the weight without causing collapse of the stack. Further, in keeping with this feature, the stabilizer bars comprising the frame 38 are relatively flat and thin so as not to interfere with the continuity of the stack, and each stack will remain stable on the pallet.

In order to make optimum use of the squeezing action which the stabilizer apparatus is capable of providing, and to insure a wedging or binding of the stabilizer rod in the bar when under load conditions, the stabilizer portion 52 is bowed outwardly a suitable amount, as seen in FIG. 3, so as to bear more firmly against the side walls 34 of the tires when positioned as seen in FIG. 2. By bowing the rod in this manner, the applicable force to certain of the tire treads is increased somewhat without being so severe as to endanger the collapse or deformation of the relatively thin walls of the tire carcasses. Likewise the lateral reaction pressures on the rod portion 52 tend to tip the rod so that it binds in the hole 60 in which it resides so that the stabilizer rod 50 remains firmly engaged with the bars 40 by a binding action as long as pressure is on the extended rod portion 52. Once this pressure is removed, the bar 50 is as easily removed by pulling it out vertically, as it was assembled, and the fixture is easily dismantled for storage.

Fixtures constructed in accordance with the invention may assume forms other than that shown in FIG. 1, depending upon the manner in which the tires are to be stacked and stored. For example, referring to FIG. 5, there is shown another embodiment of the invention for use where three stacks of tires are employed rather than four as previously discussed. In such a situation, a generally Y-shaped frame 70 may be employed, having three members 72 projecting radially outward from a central point and disposed in the instant case approximately 120° apart. The tires are stacked in abutting relation with adjacent stacks such that lines connecting the centers of adjacent stacks together define a triangle.

Insofar as the frame 70 is concerned, it may be of one-piece construction as shown, or alternatively the bars may be fastened in any suitable manner to a central piece so as to permit adjustment, for example, of the angular relationship to fit the particular stacking arrangement.

Retainer rods 74 are provided and used in the same manner with the Y frame, as they were used with the X frame discussed earlier herein. The squeezing effect produced by the fixture will also be essentially the same as that discussed previously, the principal difference being in regard to the components of the actual squeeze forces applied between adjacent abutting stacks of tires, which will vary in accordance with the angular disposition of the legs and the relationship of the tire stacks.

It will be appreciated that, while the retainer members 50 are shown and described as "rods," various other suitable constructions may be employed to obtain the same finger-like stabilizing squeeze pressure between tire stacks. This is so, it will be noted, even though adjacent stacks are of different diameter tires, e.g., one stack of 16″ diameter tires, and an adjacent stack of 14″ diameter tires. Further, the stabilizer members might, without departing from the invention, be brought to bear against the outer tread portions of the tires in a stack, where such positioning would be advantageous, rather than on the inner edge of the side wall. Also, as exemplified by the discussion of the embodiments of FIGS. 1 and 5, those skilled in the art will be able to adapt these teachings to a number of different stacking relationships without departure from the invention.

I claim as my invention:

1. A fixture for stabilizing a plurality of abutting vertical stacks of relatively thin walled tires, said fixture comprising, in combination, a frame adapted for disposition in overlying relation with a plurality of tires each at substantially the same level in the stacks, a plurality of stabilizer rods adjustably mounted in depending relation with said frame, each said stabilizer rod being positioned on said frame so as to maintain lateral pressure against the tires in its associated stack urging the same against an adjacent stack.

2. A fixture for stabilizing a plurality of abutting stacks of relatively thin walled tires on a pallet, said fixture comprising the combination of a supporting frame disposed across said tire stacks, means defining holes in said frame, retaining rods mounted in said holes and disposed in depending relation with said frame and abutting engagement with the tire stacks, said engagement being such that the tires of each adjacent stack are urged together so as to stabilize the load on the side walls of the tires.

3. In combination with a pallet having adjacent vertical stacks of thin walled tires thereon, a fixture for stabilizing the stacks of tires on the pallet including a plurality of bar members disposed across the tire stacks, means defining holes in said bar members, retaining rods engaging said holes and passing downward into the tire stacks, said rods being bowed inwardly and against the edges of the side walls of the tires, whereby adjacent stacks of tires are urged together so as to stabilize the load on the side walls of the tires.

4. A fixture for stabilizing a plurality of abutting vertical stacks of relatively thin walled tires, said fixture comprising, in combination, a frame adapted for disposition in overlying relation with a plurality of tires each at substantially the same level in said stacks, means defining a plurality of holes in said frame, and a plurality of stabilizer rods mounted in depending relation with said frame, each said stabilizer rod being adjustably connected to said frame by selected ones of said holes so as to maintain lateral pressure against the tires in its associated stack urging the same against an adjacent stack.

5. A fixture for stabilizing a plurality of adjacent stacks of thin walled tires mounted on a pallet and comprising, in combination, an elongated bar passing transversely over a pair of stacks, retaining rods adjustably mounted in depending relation from said bar and in lateral bearing relation with the tires, each said rod having an elongated retainer portion, and each said rod also having a hooked end portion adapted to lockingly engage said bar.

6. In combination with a pallet having adjacent vertical stacks of thin walled tires thereon, a fixture for stabilizing the stacks of tires on the pallet including a plurality of bar members fastened together and disposed across the tire stacks, said bar members being disposed in said vertical stacks at some intermediate place between the tops and bottoms thereof, means defining a plurality of longitudinally aligned holes in said bar members, retaining rods engaging said holes and passing downward into the tire stacks, said rods being bowed inwardly and against the edges of the side walls of the tires, whereby adjacent stacks of tires are urged together so as to stabilize the load on the side walls of the tires.

7. A fixture for stabilizing two diagonally opposed pairs of abutting stacks of thin walled tires mounted on a pallet and comprising, in combination, a bar disposed in a lateral plane and in overlying relation with one pair of diagonally opposed stacks, said bar having retaining rods depending therefrom in bearing relation with the tires of said one pair of stacks, each said rod having an elongate retainer portion, and each said rod also having a hooked end portion adapted to lockingly engage said bar.

8. In combination with a pallet having adjacent vertical stacks of thin walled tires thereon, a fixture for stabilizing the stacks of tires on the pallet including a pair of bar members fastened together to form an X across said tire stacks, said bar members being disposed in the stacks intermediate the tops and bottoms thereof, means defining a plurality of longitudinally aligned holes in said bar members, retaining rods engaging said holes and passing downward into the tire stacks, said rods being disposed to bear laterally against the edges of the side walls of the tires, whereby adjacent stacks of tires are urged together so as to stabilize the load on the walls of the tires.

9. In combination with a pallet having adjacent vertical stacks of thin walled tires thereon, a fixture for stabilizing the stacks of tires on the pallet including a pair of bar members fastened together to form a Y across the tire stacks, said bar members being disposed in the stacks intermediate the tops and bottoms thereof, means defining a plurality of longitudinally aligned holes in said bar members, retaining rods engaging said holes and passing downward into the tire stacks, said rods being bowed inwardly and against the edges of the side walls of the tires.

References Cited by the Examiner

UNITED STATES PATENTS 2,702,641   2/1955   Arthur _____ 294—87

GERALD M. FORLENZA, *Primary Examiner.*

MORRIS TEMIN, *Assistant Examiner.*